(12) United States Patent
Mimura

(10) Patent No.: US 6,750,577 B2
(45) Date of Patent: Jun. 15, 2004

(54) STATOR STRUCTURE FOR A ROTATION DETECTOR

(75) Inventor: Hisashi Mimura, Nagano-ken (JP)

(73) Assignee: Tamagawa Seiki Kabushiki Kaisha, Nagano-ken (JP)

( * ) Notice: Subject to any disclaimer, the term of this patent is extended or adjusted under 35 U.S.C. 154(b) by 0 days.

(21) Appl. No.: 10/314,339

(22) Filed: Dec. 9, 2002

(65) Prior Publication Data

US 2003/0222521 A1 Dec. 4, 2003

(30) Foreign Application Priority Data

May 31, 2002 (JP) ........................................ 2002-159483

(51) Int. Cl.$^7$ ................................................ H02K 11/00
(52) U.S. Cl. ........................................ 310/71; 310/67 R
(58) Field of Search ................................ 310/71, 67 R, 310/254

(56) References Cited

U.S. PATENT DOCUMENTS

| 5,214,331 A | * | 5/1993 | Nishimura et al. ........... 310/71 |
| 5,920,135 A | | 7/1999 | Ohshita |
| 6,028,383 A | | 2/2000 | Ohshita |
| 6,031,307 A | * | 2/2000 | Ohshita ........................ 310/71 |
| 6,044,545 A | | 4/2000 | Ohshita |
| 6,278,216 B1 | * | 8/2001 | Li ............................... 310/254 |

FOREIGN PATENT DOCUMENTS

| JP | 10-201160 A | 7/1998 | ............. H02K/3/50 |
| JP | 2000-354347 A | 12/2000 | ............. H02K/5/22 |

* cited by examiner

Primary Examiner—Burton S. Mullins
Assistant Examiner—Nguyen Hanh
(74) Attorney, Agent, or Firm—Sughrue Mion, PLLC

(57) ABSTRACT

To ensure mounting between a stator body and a motor or the like by causing a connector portion integrally formed to an insulating member to be positioned away from the stator body through an inclined surface and a gap. In a stator structure for a rotation detector according to the present invention, the inclined surface is formed on the connector portion placed at a part of one of a pair of insulating members of the stator body, and this inclined surface and the gap cause the connector portion to be located away from the stator body, whereby the stator body can be certainly mounted in a motor or the like.

4 Claims, 2 Drawing Sheets

1: STATOR BODY
3,4: INSULATING MEMBER
5: STATOR WINDING
10: CONNECTOR PORTION
11: CONNECTOR PIN
30: INCLINED SURFACE
31: AXIAL PLANE
32: GAP

- 1: STATOR BODY
- 3, 4: INSULATING MEMBER
- 5: STATOR WINDING
- 10: CONNECTOR PORTION
- 11: CONNECTOR PIN
- 30: INCLINED SURFACE
- 31: AXIAL PLANE
- 32: GAP

- 2: MAGNETIC POLE
- 10: CONNECTOR PORTION
- 33: RIB
- 40: MOUNTING SURFACE

10: CONNECTOR PORTION

STATOR STRUCTURE FOR A ROTATION DETECTOR

BACKGROUND OF THE INVENTION

1. Field of the Invention

The present invention relates to a stator structure for a rotation detector, and more particularly, to a novel improvement in a stator structure for a rotation detector for positioning a connector portion provided integrally to an insulating member away from a stator body via an inclined surface and a gap, and mounting the stator body in a motor or the like with its entire circumference utilized, whereby concentricity between the mounted stator and the motor or the like can be ensured.

2. Description of the Related Art

In general, the structures shown in FIG. 3 and FIG. 4 are conventionally employed as a stator structure for a rotation detector of this type.

More specifically, in FIG. 3 and FIG. 4, reference numeral 1 denotes a stator body which is an annular shape as a whole and formed by laminating a plurality of stator pieces 1a. An inner surface of the stator body 1 is provided with a plurality of inwardly projecting magnetic poles 2 around which stator windings 5 are wound through a pair of insulating members 3 and 4, and these stator windings 5 are disposed in slots 6 between the respective magnetic poles 2.

The respective insulating members 3 and 4 are integrally formed by resin-molding, and a part of the outer circumference of the insulating members 3 and 4 is provided with a connector portion 10 which is formed integrally with the respective insulating members 3 and 4 and projects outwardly in a radial direction.

The connector portion 10 has connector pins 11 formed by insert molding and connected to the stator windings 5.

The conventional stator structure for a rotation detector employs the structure as described above, and therefore has the following problem.

More specifically, since the connector portion is so formed as to be connected directly to the outer circumferences of the respective insulating members, this connector portion becomes an obstacle in mounting the stator body in a robot or a motor or the like to construct a resolver, so that the stator body cannot be mounted in such a manner that its entire circumference is covered. For this reason, a housing of the motor is partially cut away to mount the stator body therein, for example, and the mounting operation of the resolver requires a great deal of man-hour for a working process.

Moreover, especially in a case of a resolver using a stator of a small diameter, a part of the stator body cannot be utilized for mounting the stator body since this connector portion becomes an obstacle, with the result that fitting portions are reduced and concentricity between the mounted stator body and the motor is not established.

SUMMARY OF THE INVENTION

The present invention has been made to solve the above-mentioned problem, and an object of the present invention is, in particular, to provide a stator structure for a rotation detector in which a connector portion provided integrally to an insulating member is disposed away from a stator body via an inclined surface and a gap and the stator body is mounted in a motor or the like with its entire circumference utilized, whereby concentricity between the mounted stator body and the motor can be established.

According to the present invention, there is provided a stator structure for a rotation detector, including: a stator body which is formed into an annular shape as a whole and has a plurality of magnetic poles projecting inwardly; stator windings wound around the magnetic poles through an insulating member; a connector portion positioned outside the insulating member disposed on one of end faces of the stator body, the connector portion having connector pins formed integrally with the insulating member; an inclined surface formed on the connector portion in such a manner as to be non-parallel to an axial plane of a circumferential surface of the stator body; and a gap formed between the inclined surface and the axial plane, the gap causing the connector portion to be positioned away from the axial plane. Further, in the stator structure for a rotation detector according to the present invention, the inclined surface is provided with a plurality of ribs. Further, in the stator structure for a rotation detector according to the present invention, the stator body is a stator body for a resolver.

DESCRIPTION OF THE PREFERRED EMBODIMENT

Figure 1:
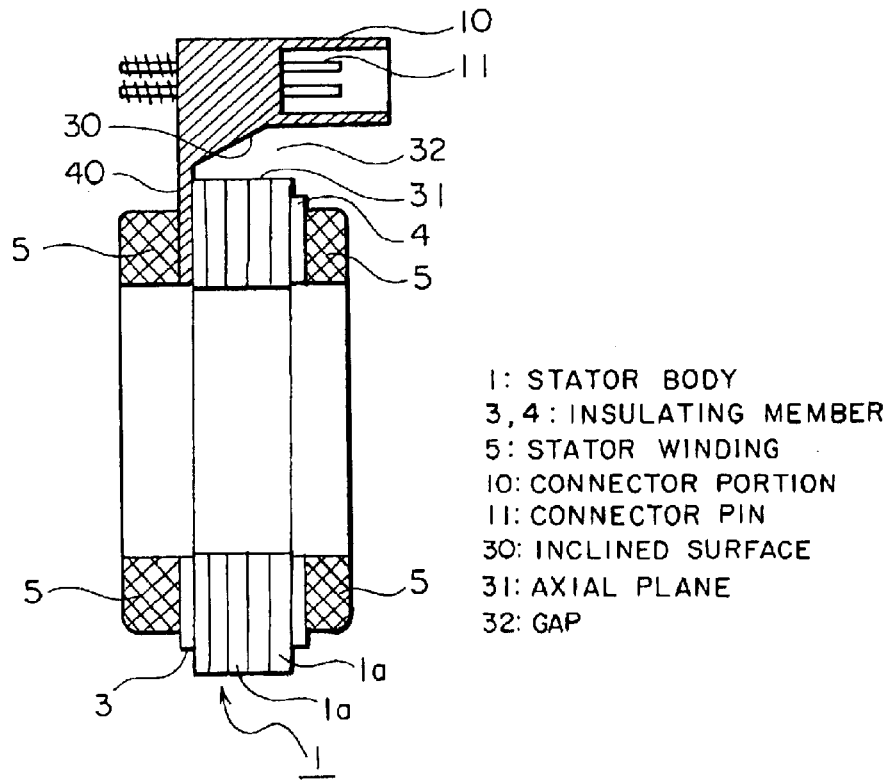
FIG. 1 is a sectional view showing a stator structure for a rotation detector according to the present invention.

Hereinafter, a preferred embodiment of a stator structure for a rotation detector according to the present invention will be described with reference to the accompanying drawings. Here, parts similar or equivalent to those of the prior art are described using reference numerals identical with those used in the prior art.

Figure 2:
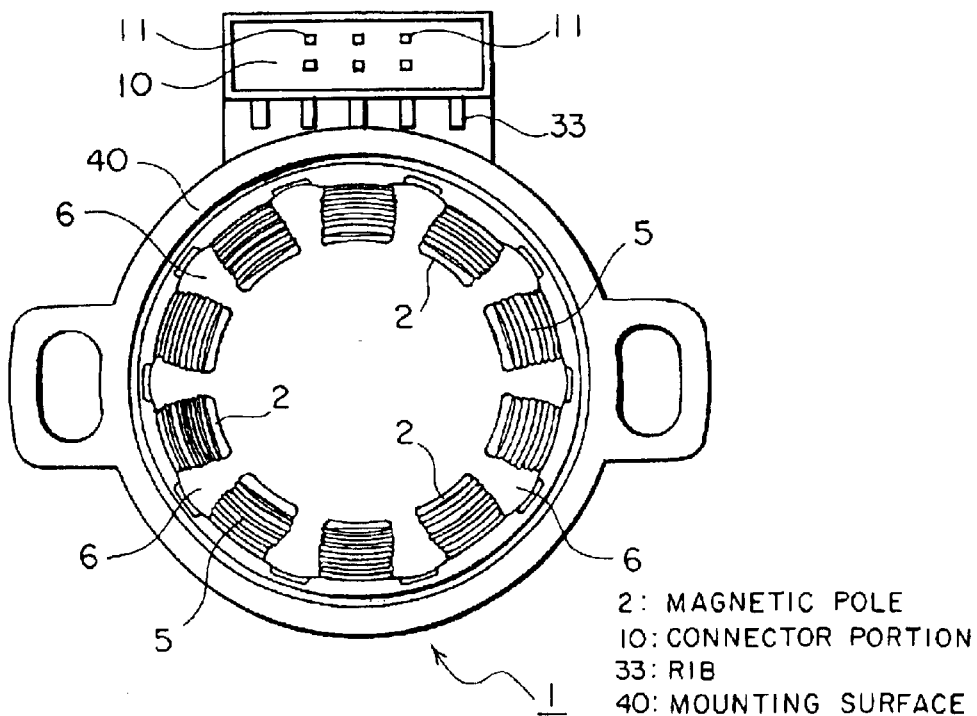
FIG. 2 is a right-side view before section of the stator structure shown in FIG. 1.
Figure 3:
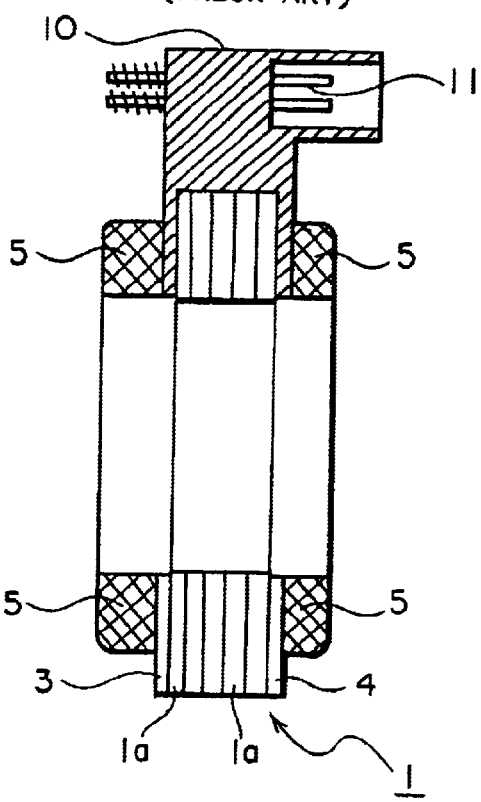
FIG. 3 is a sectional view showing a conventional structure.
Figure 4:
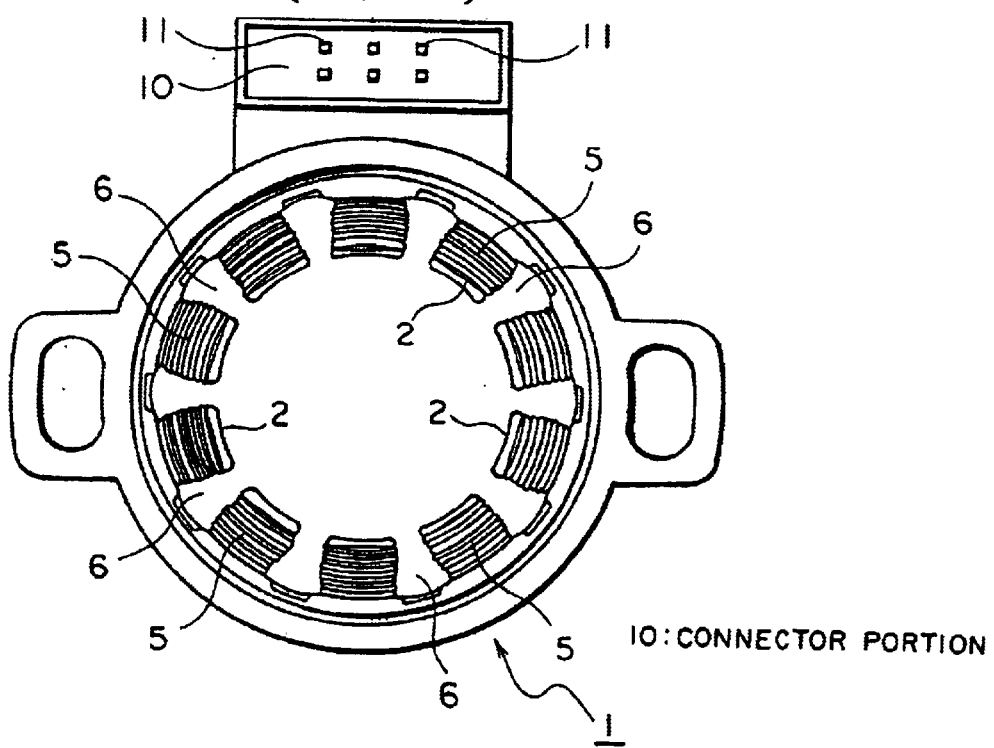
FIG. 4 is a right-side view before section of the stator structure shown in FIG. 3.

In FIG. 1 and FIG. 2, reference numeral 1 denotes a stator body which is of an annular shape as a whole and formed by laminating a plurality of stator pieces 1a. An inner surface of the stator body 1 is provided with a plurality of inwardly projecting magnetic poles 2 around which stator windings 5 are wound through a pair of insulating members 3 and 4, and these stator windings 5 are disposed in slots 6 between the respective magnetic poles 2.

The insulating members 3 and 4 are respectively formed by resin-molding, and a part of an outer circumference of the insulating member 3 is provided with a connector portion 10 which is formed integrally with the insulating member 3 and projects outwardly in a radial direction.

The connector portion 10 has connector pins 11 formed by insert molding and connected to the stator windings 5.

The connector portion 10 is not integrally connected to the pair of insulating members 3 and 4 as in prior art but integrally connected only to the insulating member 3. In addition, the connector portion 10 is disposed further outside with respect to the insulating member 3 through an inclined surface 30 as compared to the prior art.

Moreover, since in the connector portion 10, the inclined surface 30 is so formed as to overhang the stator body 1, and a surface direction of the inclined surface 30 is not parallel to an axial plane 31 extending along an axial direction of a circumferential surface of the stator body 1, a substantially wedge-shaped gap 32 is formed between the inclined surface 30 and the axial plane 31.

Therefore, the connector portion 10 is disposed sufficiently away from the stator body 1 as compared to the prior art. In addition, a plurality of ribs 33 are formed in the inclined surface 30 to reinforce the inclined surface 30 whose thickness is reduced.

Since the connector portion 10 is positioned further outside as compared to the prior art when the stator body 1 is connected to the motor or the like, a mounting surface 40 is formed on an entire end face in the circumferential direction of the stator body 1 so that the connector portion 10 does not protrude. By bonding this mounting surface 40 to the entire surface of a case of the motor or the like, the stator body 1 can be attached to the motor or the like.

Since the stator structure for a rotation detector according to the present invention employs the structure as described above, the following effect can be obtained.

More specifically, since the connector portion formed integrally with the insulating member is positioned on the outside of and at a sufficient distance from the stator body via the inclined surface and the gap, the stator body can be mounted in the case of the motor or the like securely and easily without cutting away a part of the motor or the like.

Moreover, by means of the above-mentioned mounting operation, concentricity between the mounted stator body and the motor or the like is improved, and an extensive improvement of detection accuracy as a resolver can be achieved.

What is claimed is:

1. A stator structure for a rotation detector comprising:

a stator body which is formed into an annular shape as a whole and has a plurality of magnetic poles projecting inwardly;

stator windings wound around the magnetic poles through an insulating member;

a connector portion positioned outside the insulating member disposed on one of end faces of the stator body, the connector portion having connector pins formed integrally with the insulating member;

an inclined surface formed on the connector portion in such a manner as to be non-parallel to an axial plane of a circumferential surface of the stator body; and a gap formed between the inclined surface and the axial plane, the gap causing the connector portion to be positioned away from the axial plane.

2. A stator structure for a rotation detector according to claim 1, wherein the inclined surface is provided with a plurality of ribs.

3. A stator structure for a rotation detector according to claim 1, wherein the stator body is a stator body for a resolver.

4. A stator structure for a detector according to claim 2, wherein the stator body is stator body for a resolve.

* * * * *